R. R. McFARLAND.
NUT LOCK.
APPLICATION FILED AUG. 16, 1919.

1,368,637.

Patented Feb. 15, 1921.

SECTION-A-A

SECTION-B-B

INVENTOR
Robert R. McFarland
by Damni S. Wolcott
atty

UNITED STATES PATENT OFFICE.

ROBERT R. McFARLAND, OF WILKINSBURG, PENNSYLVANIA.

NUT-LOCK.

1,368,637.        Specification of Letters Patent.        Patented Feb. 15, 1921.

Application filed August 16, 1919. Serial No. 317,967.

*To all whom it may concern:*

Be it known that I, ROBERT R. MCFARLAND, residing at Wilkinsburg, in the county of Allegheny and State of Pennsylvania, a citizen of the United States, have invented or discovered certain new and useful Improvements in Nut-Locks, of which improvements the following is a specification.

The invention described herein relates to an improvement in means employed for securing the nipple of the inner tubes of pneumatic tires to the rims of the wheels and in locking the protecting cap of the nipple in position, and the invention has for its object a construction whereby the cap may be detachably secured in position and when so secured will operate as a lock for the nut employed for holding the nipple in place. The invention is hereinafter more fully described and claimed.

Figure 1:
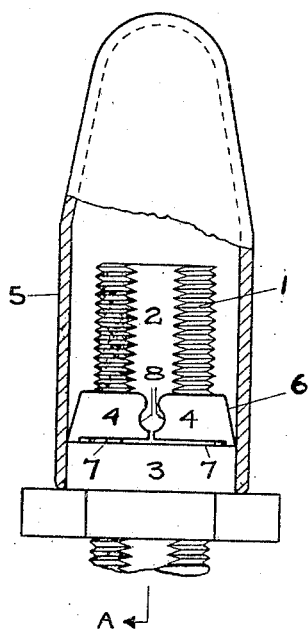
Figure 2:
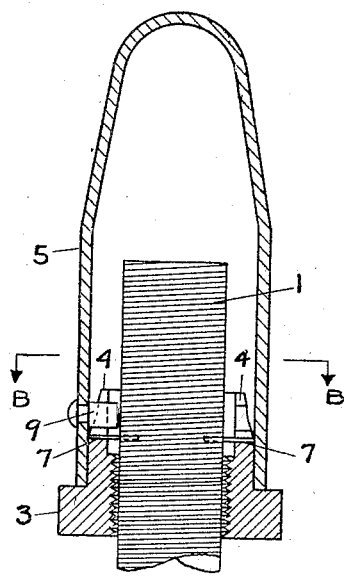

In the accompanying drawing forming a part of this specification, Figure 1 is a view partly in elevation and partly in section of a portion of a nipple for the inner tube of a pneumatic tire showing the holding nut and protecting cap in place, said parts having the improvement applied thereto; Fig. 2 is a sectional elevation on a plane indicated by the line A—A, Fig. 1; and Fig. 3 is a sectional view on a plane indicated by the line B—B, Fig. 2.

Figure 3:
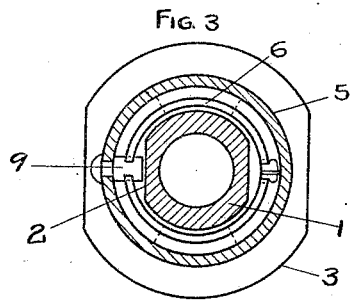

In the practice of the invention the nipple 1 is constructed in the usual manner with external threads for engagement with a nut and having one or more flattened faces 2 extending longitudinally of the nipple as shown in Figs. 1 and 3. The nut 3 is provided with resilient jaws 4 adapted to so engage the cap 5 in such manner as to prevent either cap or nut from rotation independent one of the other, and also to prevent the cap from accidental removal from the nipple. The cap which is slid longitudinally onto the nipple and into engagement with the jaws 4 is provided with suitable means for engagement with one or more of the flat faces 2 of the nipple and is thereby held from rotation. As the cap when slid into position cannot rotate and as the cap engages the nut, the latter cannot work loose on the nipple.

A convenient manner of providing the nut with resilient jaws consists in forming on the nut an extension or collar 6 preferably substantially thinner than the wall of the nut. In the collar are formed slits 7 in planes at right angles to the axis through the collar and the portion or portions of the collar thus separated from the nut are divided into two parts by cuts at right angles to the slits thereby forming one or more pairs of resilient jaws 4, the adjacent ends of the jaws being provided with notches 8, adapted to engage a pin 9 secured to a cap projecting inwardly a sufficient distance to bear on the flat faces 2 of the nipple or to so closely approach such face as to prevent the cap and nut making a complete rotation around the nipple.

In using this device the nut is screwed onto the nipple and the opening between the end of one of the pairs of jaws 4 brought opposite one of the flat faces 2. The cap is then slid over the nipple and the pin forced between the jaws and into the notches 8. The jaws are so constructed that a comparatively strong pull is required to remove the cap which by reason of the position of the pin relative to the face 2 of the nipple will prevent any material rotation of the nut.

I claim herein as my invention:

1. An externally threaded stem in combination with a nut provided with resilient jaws and adapted to screw onto the stem and a cap adapted to be engaged by the jaws and to be engaged by the stem to prevent the rotation of one of said parts relative to the other.

2. A threaded nipple for tubes in combination with a nut adapted to screw onto the nipple, and a cap for protecting the nipple and adapted to be slipped longitudinally over the nipple and provided internally with means adapted to be placed in engagement and to be disengaged from the nut and nipple by the longitudinal movement of the cap.

3. An externally threaded stem having a flat face in combination with a nut adapted to screw onto the stem and provided with resilient jaws and a cap adapted to fit over the nipple and provided with an inwardly projecting pin adapted to be engaged by the jaws and to extend into such relation with the flat face on the stem as to prevent any rotation of the cap.

4. An externally threaded stem in combination with a nut, a cap adapted to be slipped over the stem and nut, means whereby the cap and nut are detachably connected and locked as against independent rotation and means interposed between the cap and stem for locking them as against independent rotation but permitting the cap to move longitudinally of the stem.

In testimony whereof, I have hereunto set my hand.

ROBERT R. McFARLAND.